(12) United States Patent
Mori et al.

(10) Patent No.: US 8,124,474 B2
(45) Date of Patent: Feb. 28, 2012

(54) METHOD FOR PRODUCING ELECTRODE FOR ELECTRIC DOUBLE LAYER CAPACITOR

(75) Inventors: Hidekazu Mori, Tokyo (JP); Guemju Cha, Tokyo (JP)

(73) Assignee: Zeon Corporation, Tokyo (JP)

( * ) Notice: Subject to any disclaimer, the term of this patent is extended or adjusted under 35 U.S.C. 154(b) by 812 days.

(21) Appl. No.: 10/562,554

(22) PCT Filed: Jun. 30, 2004

(86) PCT No.: PCT/JP2004/009578
§ 371 (c)(1),
(2), (4) Date: Dec. 28, 2005

(87) PCT Pub. No.: WO2005/001861
PCT Pub. Date: Jan. 6, 2005

(65) Prior Publication Data
US 2006/0139846 A1    Jun. 29, 2006

(30) Foreign Application Priority Data

Jun. 30, 2003   (JP) .................................. 2003-186986

(51) Int. Cl.
*H01L 21/20*   (2006.01)
(52) U.S. Cl. .................... 438/239; 257/E21.011
(58) Field of Classification Search .......... 438/238–239, 438/396; 361/502; 29/25.03; 427/79; 429/217; 257/E21.011
See application file for complete search history.

(56) References Cited

U.S. PATENT DOCUMENTS

| | | | | |
|---|---|---|---|---|
| 4,717,595 A * | 1/1988 | Watanabe et al. | ............. | 427/221 |
| 5,706,165 A * | 1/1998 | Saito et al. | ..................... | 361/502 |
| 6,246,568 B1 * | 6/2001 | Nakao et al. | ................... | 361/502 |
| 6,258,337 B1 * | 7/2001 | Sonobe et al. | ............ | 423/445 R |
| 6,294,257 B1 * | 9/2001 | Tsukakoshi et al. | .......... | 428/400 |
| 6,800,222 B1 * | 10/2004 | Noguchi et al. | .............. | 252/502 |
| 7,326,497 B2 * | 2/2008 | Matsubara et al. | ......... | 429/231.8 |
| 2001/0051300 A1 * | 12/2001 | Moriguchi et al. | ......... | 429/231.8 |
| 2003/0158310 A1 | 8/2003 | Asano et al. | | |

FOREIGN PATENT DOCUMENTS

| | | |
|---|---|---|
| JP | 61-58850 A | 3/1986 |
| JP | 62-016506 A | 1/1987 |
| JP | 63-104316 A | 5/1988 |
| JP | 63-107011 A | 5/1988 |
| JP | 63-151010 A | 6/1988 |
| JP | 02-235320 A | 9/1990 |

(Continued)

OTHER PUBLICATIONS

Japanese Office Action issued Jun. 1, 2010, in corresponding Japanese Application No. 2005-511154 (English Translation).

*Primary Examiner* — Kevin Parendo
(74) *Attorney, Agent, or Firm* — Birch, Stewart, Kolasch & Birch, LLP

(57) ABSTRACT

A method for producing an electrode for electric double layer capacitors is disclosed which includes: a step of mixing a particulate elastomer and a carbonaceous material with each other in a powdery form, thereby obtaining a powdery mixture; and a step of dry-forming the resultant powdery mixture, thereby forming an electrode layer. With this method, an electrode which enables to form a high-capacity electric double layer capacitor can be produced by simplified steps with high productivity.

8 Claims, 1 Drawing Sheet

A step of mixing 1) a particulate elastomer selected from polybutadiene modified with carboxyl group, polyisoprene modified with carboxyl group or styrene/butadiene copolymer modified with carboxyl group with 2) a carbonaceous material comprising activated carbon as an active material thereby obtaining a powdery mixture, wherein the particulate elastomer is in a concentration of 2 to 10 parts by weight per 100 parts by weight of the combination of the particulate elastomer and the carbonaceous material A step of dry-forming the resulting powdery mixture

FOREIGN PATENT DOCUMENTS

| | | |
|---|---|---|
| JP | 04-022062 A | 1/1992 |
| JP | 04-039862 A | 2/1992 |
| JP | 04-067610 A | 3/1992 |
| JP | 04-294515 A | 10/1992 |
| JP | 06-196364 A | 7/1994 |
| JP | 7-161589 A | 6/1995 |
| JP | 08-250380 A | 9/1996 |
| JP | 09-306798 A | 11/1997 |
| JP | 11-162794 A | 6/1999 |
| JP | 11-162794 A | 6/1999 |
| JP | 11-288721 A | 10/1999 |
| WO | WO 01/78171 A1 | 10/2001 |

\* cited by examiner

A step of mixing 1) a particulate elastomer selected from polybutadiene modified with carboxyl group, polyisoprene modified with carboxyl group or styrene/butadiene copolymer modified with carboxyl group with 2) a carbonaceous material comprising activated carbon as an active material thereby obtaining a powdery mixture, wherein the particulate elastomer is in a concentration of 2 to 10 parts by weight per 100 parts by weight of the combination of the particulate elastomer and the carbonaceous material A step of dry-forming the resulting powdery mixture

FIGURE 1

METHOD FOR PRODUCING ELECTRODE FOR ELECTRIC DOUBLE LAYER CAPACITOR

TECHNICAL FIELD

The present invention relates to a method for producing an electrode for an electric double layer capacitor.

BACKGROUND ART

About electric double layer capacitors using an electric double layer formed at interface of a polarizable electrode and an electrolyte surface, the demand thereof as memory backup electric power sources has been rapidly expanding in recent years. Moreover, attention has been paid to the application thereof to articles for which a high capacity is required, such as a power source for a fuel cell mounted vehicle.

An electrode for an electric double layer capacitor has a structure obtained by molding an electrode-forming composition comprising a carbon material as an active material, a binder and an optional electroconductivity additive to prepare an electrode layer, and then laminating the electrode layer on a metal foil, metal mesh or the like as a current collector.

As the method for molding the electrode layer, press-molding is known. For example, Japanese Patent Application Laid-Open (JP-A-) Nos. 63-107011 and 2-235320 each suggest a method of press-molding an electrode-forming composition comprising fine carbon particles, a fluorine-containing polymer such as polytetrafluoroethylene (PTFE), and a liquid lubricant to form an electrode layer. JP-A No. 9-306798 also suggests a method of integrating a kneaded product of activated carbon and PTFE as a binder with a current collector electrode made of metal and press-molding the integrated product to form an electrode.

However, in the case of using PTFE as a binder, it is necessary to pre-knead the electrode-forming composition to turn PTFE into a fibrous form and it is also necessary to remove a kneading auxiliary agent added at the time of the pre-kneading. In such a way, a problem that the process becomes complicated is caused. When PTFE is pre-kneaded, regions made into a fibrous form and regions not made into a fibrous form are generated; therefore, when an electrode layer in a thin film form is formed, the surface of the resultant easily becomes uneven. Thus, the strength of the electrode may be insufficient or the performance of the electric double layer capacitor to be obtained may not be sufficiently good.

As a method using a binder other than PTFE, suggested is also a method of molding activated carbon having a specific particle diameter and plastic powder having a specific particle diameter into a plate form at a temperature near to the melting point of the plastic (JP-A No. 4-22062). Suggested is also a method of mixing activated carbon, an electroconductive material, and binder powder made of a thermoplastic resin or B-stage thermosetting resin in a powdery state to obtain mixed powder, and press-molding the mixed powder to form an electrode (JP-A No. 63-151010). However, according to these methods, the resultant electrode is insufficient in flexibility. Thus, when the electrode is wounded and then put into a container, its electrode layer may be cracked or may fall away from the current corrector. The performance of the electric double layer capacitor to be obtained is also insufficient.

As a method using an elastomer as a binder, JP-A No. 62-16506 suggests a method of mixing a latex and activated carbon, dehydrating the mixture, grinding and granulating the resultant aggregate, and then press-molding the granulated product. Furthermore, JP-A No. 8-250380 suggests a method of press-molding a mixture obtained by mixing a solution of styrene butadiene rubber or acrylonitrile butadiene rubber in xylene with activated carbon and then drying the resultant. However, the methods described in these documents have complicated steps, and the performance of the electric double layer capacitor to be obtained is also insufficient.

DISCLOSURE OF THE INVENTION

In light of problems as described above in the prior art, an object of the present invention is to provide a method for producing an electrode for giving an electric double layer capacitor having a high capacity, with a good productivity, through simplified steps.

The present inventors have made eager investigations to solve the above-mentioned problems. As a result, the present inventors have found out that: in a method of mixing a latex with activated carbon, pores in the activated carbon are embedded with an emulsifier and so on in the latex, and in the method of using plastic powder as a binder or in the method of mixing a solution of styrene butadiene rubber or acrylonitrile butadiene rubber in xylene with activated carbon, the surface of the activated carbon is covered with the binder; therefore, the capacity of the electric double layer capacitor to be obtained may lower.

Furthermore, it has been found out that an electrode for an electric double layer capacitor can be effectively formed by mixing a particulate elastomer and a carbonaceous material in a powdery form and then dry-forming the powdery mixture obtained by the mixing, and an electric double layer capacitor wherein the electrode is used exhibits a high electrostatic capacity. On the basis of these findings, the present invention has been made.

The present inventors have made the following invention based on these findings.

Thus, according to a first aspect of the present invention, provided is a method for producing an electrode for an electric double layer capacitor, comprising a step of mixing a particulate elastomer and a carbonaceous material with each other in a powdery form, thereby obtaining a powdery mixture, and a step of dry-forming the resultant powdery mixture, thereby forming an electrode layer.

The particulate elastomer is preferably an elastomer having a crosslinked structure.

The carbonaceous material preferably comprises activated carbon as an active material.

Preferably, the carbonaceous material further comprises an electroconductivity additive.

The above-mentioned method for producing an electrode for an electric double layer capacitor preferably comprises a step of causing the electroconductivity additive to adhere onto the surface of the active material by mechanochemical treatment.

The powdery mixture is preferably a mixture obtained by fluidized bed granulation or fluidized bed multifunction mode granulation.

The particle diameter of the powdery mixture is preferably from 0.1 to 1000 μm.

The dry-forming is preferably press-molding.

The press-molding is preferably performed inside a mold wherein a current collector is set.

Preferably, the powdery mixture comprises, in 100 parts by weight thereof, 0.1 to 50 parts by weight of the particulate elastomer and 50 to 99.9 parts by weight of the carbonaceous material.

According to a second aspect of the present invention, provided is an electrode for an electric double layer capacitor which is obtained by the above-mentioned production method.

According to a third aspect of the present invention, provided is an electric double layer capacitor comprising the above-mentioned electrode.

BRIEF DESCRIPTION OF THE DRAWINGS

FIG. 1 is a block flow diagram depicting at least two of the steps in the present method for producing an electrode for an electric double layer capacitor.

BEST MODES FOR CARRYING OUT THE INVENTION

The following will describe components which constitute the electrode of the present invention for an electric double layer capacitor, and a method for producing the electrode.
(1) Components Which Constitute the Electrode The electrode layer of the electrode of the invention for an electric double layer capacitor comprises a particulate elastomer which is a binder, and a carbonaceous material.
<Particulate Elastomer>

In the invention, the particulate elastomer has a function as a binder. The particulate elastomer is used as a binder and is mixed with a carbonaceous material in a powdery form, thereby making even dispersion thereof possible. The particulate elastomer of the invention may be an elastomer made into a particle form by communition or the like, and is preferably a polymer made into a particle form through a chemical crosslinked structure. The use of the polymer having the crosslinked structure makes it possible to keep the particle shape thereof stable. Specifically, a conjugated diene or a polyfunctional ethylenically unsaturated monomer can be made into a polymer having a crosslinked structure by homopolymerization or copolymerization thereof. Examples of the conjugated diene include butadiene and isoprene. Examples of the polyfunctional ethylenically unsaturated monomer include dimethacrylic acid esters such as ethylene glycol dimethacrylate and diethylene glycol dimethacrylate; trimethacrylic acid esters such as trimethylolpropane trimethacrylate; and divinyl compounds such as divinylbenzene.

These conjugated dienes or polyfunctional ethylenically unsaturated monomers may be copolymerized with a monofunctional radical-copolymerizable monomer. Examples of the monofunctional radical-copolymerizable monomer include acrylic acid esters such as butyl acrylate and 2-ethylhexyl acrylate; methacrylic acid esters such as butyl methacrylate and 2-ethylhexyl methacrylate; aromatic vinyl compounds such as styrene; ethylenically α,β-unsaturated nitrile compounds such as acrylonitrile and methacrylonitrile; and ethylenically unsaturated carboxyl acids such as acrylic acid, methacrylic acid, and itaconic acid.

A preferred example of the polymer used as the particulate elastomer in the invention is a copolymer made from a polyfunctional ethylenically unsaturated monomer and an acrylic acid ester. Specific examples thereof include 2-ethylhexyl acrylate/methacrylic acid/acrylonitrile/ethylene glycol dimethacrylate copolymer, 2-ethylhexyl acrylate/methacrylic acid/methacrylonitrile/diethylene glycol dimethacrylate copolymer, butyl acrylate/acrylonitrile/diethylene glycol dimethacrylate copolymer, and butyl acrylate/acrylic acid/trimethylolpropane trimethacrylate copolymer. Polybutadiene, polyisoprene or styrene/butadiene copolymer which may be modified with carboxyl group can also be preferably used. When these particulate elastomers, which have a crosslinked structure, are used as a binder, the ratio of the activated carbon surface or pores covered with the binder becomes small so that a rise in the internal resistance or a decline in the electrostatic capacity can be favorably restrained.

The particle diameter of the particulate elastomer is usually from 0.0001 to 100 μm, preferably from 0.001 to 10 μm, and more preferably from 0.01 to 1 μm. When the particle diameter is within this range, the handling thereof is easy when it is mixed with the carbonaceous material and further an excellent binding force is exhibited by use of a small amount thereof. The particle diameter means the number-average particle diameter obtained by measuring the diameters of 100 polymer particles selected at random in transmission electron microscopic photographs thereof and then calculating the arithmetic average of the diameters.

The glass transition temperature (Tg) of the particulate elastomer is usually from −60 to 20° C., preferably from −40 to 0° C. If the Tg is too high, the binding force lowers. If the Tg is too low, the surface of the active material may be covered with the particulate elastomer to increase the internal resistance.

In the invention, the amount of the used particulate elastomer is usually from 0.1 to 50 parts by weight, preferably from 1 to 20 parts by weight, and more preferably from 2 to 10 parts by weight for 100 parts by weight of the powdery mixture in order to obtain an electrode for giving an electric double layer capacitor having a high capacity.
<Carbonaceous Material>

The carbonaceous material used in the invention comprises an "active material" made of a carbonaceous substance, and if necessary, the material comprises an "electroconductivity additive".

Examples of the active material used in the invention include activated carbon, polyacene, and graphite or the like. There is used powder whose specific surface area is usually 30 m$^2$/g or more, preferably from 500 to 5000 m$^2$/g, and more preferably from 1000 to 3000 m$^2$/g. There can also be used, as the active material, non-porous carbon having carbon microcrystal similar to graphite, the interlayer distance of the carbon microcrystal being enlarged, described in JP-A No. 11-317333 and JP-A No. 2002-25867 or the like. The active material is preferably activated carbon. Specifically, activated carbon of a phenol type, a rayon type, a pitch type, a coconut husk type or the like can be used. The particle diameter of the active material is preferably from 0.1 to 100 μm, more preferably from 1 to 20 μm since the electrode for an electric double layer capacitor can be made thin and the electrostatic capacity thereof can also be made high.

Examples of the carbonaceous material used as the electroconductivity additive include carbon blacks such as furnace black, acetylene black, KETJENBLACK. The electroconductivity additive is used in the form of a mixture with the active material. The particle diameter of the electroconductivity additive is preferably from 0.1 to 100 μm. The use of the electroconductivity additive together causes a further improvement in electrical contact of the active material particles to lower the internal resistance of the electric double layer capacitor to be obtained and further make the electrostatic capacity thereof high.

When the electroconductivity additive is used in the state that the agent is caused to adhere onto the surface of the active material, respective particles thereof can be evenly dispersed. Thus, the case is preferred. An example of the method for causing the electroconductivity additive to adhere onto the surface of the active material is mechanochemical treatment of mixing the active material with the electroconductivity additive while mechanical external force such as compressive force or shearing force is applied thereto. As the device for conducting the mechanochemical treatment, a mechano-mill, a hybridizer, a mechano-fusion or the like can be used.

In the invention, the amount of the used carbonaceous material (the active material and the electroconductivity additive) is usually from 50 to 99.9 parts by weight, preferably from 70 to 98 parts by weight, and more preferably from 80 to 96 parts by weight for 100 parts by weight of the powdery mixture in order to obtain an electrode for giving an electric double layer capacitor having a high capacity. About the blend ratio between the active material and the electroconductivity additive, the amount of the electroconductivity additive is from 0.1 to 20 parts by weight, preferably from 2 to 10 parts by weight for 100 parts by weight of the active material.

(2) Method for Producing an Electrode

<Preparation of a Powdery Mixture>

In the method of the present invention for producing an electrode for an electric double layer capacitor, the above-mentioned particulate elastomer and carbonaceous material are first mixed with each other in a powdery form, thereby obtaining a powdery mixture.

In the invention, the wording "being mixed in a powdery form" means that the particulate elastomer and the carbonaceous material are mixed with each other in the state that they are each kept in a granular form. They may contain water, a solvent or the like as long as each of them can be kept in a granular form. At the time of the mixing, the concentration of solid contents is usually 50% or more by weight, preferably 60% or more by weight, and more preferably 70% or more by weight. When the solid content concentration is within this range, aggregation or the like of the particulate elastomer and the carbonaceous material is not caused so that the granular form can be kept. When the resultant powdery mixture contains water, a solvent or the like, the mixture is dried if necessary and subjected to dry forming.

The mixer used for the mixing is not particularly limited if the mixer is capable of mixing the particulate elastomer and the carbonaceous material in a powdery form. Specifically, a Henschel mixer, an Omni mixer or the like is preferably used. The mixing time is usually from several seconds to about 1 hour, preferably from 1 to 5 minutes. The mixing temperature is not particularly limited, either, and is usually room temperature.

The powdery mixture may be obtained by a granulating method such as tumbling granulation, agitation granulation, fluidized bed granulation or fluidized bed multifunction mode granulation.

The tumbling granulation, agitation granulation, fluidized bed granulation and fluidized bed multifunction mode granulation are methods of spraying the particulate elastomer onto the carbonaceous material which are forcibly caused to flow, thereby performing granulation. In these methods, the manners for causing the carbonaceous material to flow are different from each other, and in the tumbling granulation, the carbonaceous material and optional other components are tumbled inside a rotary vessel such as a rotary drum or a rotary pan. In the agitation granulation, a mixer such as a Henschel mixer is used to give flowing motion forcibly to the powder of the carbonaceous material with stirring fans or the like which are set in its vessel. The fluidized bed granulation is a method of keeping the powder of the carbonaceous material in the state that the powder is floated and suspended in air flow blown up from the bottom. The fluidized bed multifunction mode granulation is a method of combining rolling or stirring action with the fluidized bed granulation. The temperature of the fluidized bed containing the carbonaceous material is usually from room temperature to 100° C., and the particulate elastomer is sprayed usually at 50 to 250° C. Of the above-mentioned granulating methods, the fluidized bed granulation and the fluidized bed multifunction mode granulation are preferred since a powdery mixture having a small particle diameter is easily obtained and the particle diameter is easily controlled.

The particulate elastomer used in the mixing may be dried elastomer particles. Preferably, the carbonaceous material is charged into a mixer, and a latex-form particulate elastomer, which is dispersed in water, is sprayed and added thereto. According to the spray and addition, water and the particulate elastomer are evenly adsorbed on the carbonaceous material and further the carbonaceous material and the particulate elastomer are kept in a powder form.

The particle diameter of the resultant powdery mixture is usually from 0.1 to 1000 μm, preferably from 1 to 500 μm, and more preferably from 5 to 100 μm. The particle diameter means the number-average particle diameter obtained by measuring the diameters of 100 particles of the powdery mixture which are selected at random in transmission electron microscopic photographs thereof and then calculating the arithmetic average of the diameters. When the particle diameter is within this range, an electrode having a smooth surface and an even density can be obtained.

<Formation of an Electrode Layer>

The powdery mixture obtained as descried above is dry-formed into an electrode layer. The dry-forming in the invention is a conception against what is called "wet-molding", such as coating or spray. Examples of such a method include press-molding, powder molding, rolling, and extrusion molding. Of these, the press-molding is preferred. In the dry-forming, the powdery mixture may be used in the state that the mixture contains water, a solvent or the like. Water or a solvent may be further added thereto as a molding auxiliary. At the time of the molding, the concentration of solid contents is usually 50% or more by weight, preferably 60% or more by weight, and more preferably 70% or more by weight. The water or solvent can be removed by heating, pressure-reduction or the like when or after the electrode layer is formed.

In the press-molding, the powdery mixture is formed into an electrode layer shape by a leaf type press, a roll type press or the like. For the press-molding, preferred is a method of using a mold to form an electrode layer inside the mold. According to this method, a series of steps of supplying the powdery mixture into the mold, press-molding the mixture, and taking out the formed electrode layer can be made automatic. Thus, unmanned continuous production can be attained. Moreover, electrodes having different sizes and shapes can be produced only by exchanging molds, and further the electrodes can be produced by means of small-sized molding equipment. Thus, this method is suitable for the production of various kinds of electrodes. The temperature on pressing is varied in accordance with the glass transition temperature and the particle diameter of the particulate elastomer, and others, and it is advisable to select the temperature within the range from room temperature to the decomposition temperature of the used particulate elastomer. The temperature is preferably a temperature 10 to 30° C. higher than the glass transition temperature (Tg). The pressure, which depends on the temperature, is not particularly limited as long as a desired electrode density can be obtained.

The thickness of the formed electrode layer is preferably from 50 to 1000 μm, and the density of the electrode layer is preferably 0.5 g/cm³ or more. They are decided dependently on the relationship thereof with an internal resistance desired in accordance with use purpose. If the internal resistance is small, the density and the thickness of the electrode layer can be made large. As a result, the energy density can be made high. However, if the density of the electrode layer is made too high, the permeability of an electrolytic solution thereinto deteriorates. Thus, the density is preferably from 0.6 to 0.9 g/cm³.

<Production of an Electrode>

The electrode layer formed as described above is laminated onto a current collector, thereby obtaining an electrode. The current collector is not particularly limited if the collector is made of an electroconductive material. Preferred is a metal material such as iron, copper, aluminum, nickel or stainless steel. The metal material may be in the form of a sheet (metal foil), a film or a net. A carbon fiber woven, a carbon mat, an electroconductive rubber sheet, and laminates thereof can also be used as the current collector. Of these, the metal foil is preferred. Aluminum foil is particularly preferred. The thickness of the metal foil is preferably from 5 to 100 μm, in particular preferably from 10 to 50 μm.

As the current collector, a current collector having surfaces on which electroconductive paste layers are formed may be used. The electroconductive adhesive agent is an agent having at least an electroconductivity additive and a binder, and the agent can be produced by kneading the electroconductivity additive, the binder, and an optional dispersing agent in water or an organic solvent. The resultant electroconductive adhesive agent is applied onto the current collector, and dried to form a layer of the electroconductive adhesive agent. The electroconductive adhesive agent improves binding force between the electrode layer and the current collector and further contributes to reduce the internal resistance.

The electroconductivity additive used in the electroconductive adhesive agent may be any one of the electroconductivity additives exemplified in the description of the above-mentioned electrode components. The binder that can be used may be an elastomer, and is preferably the above-mentioned particulate elastomer. The dispersing agent that can be used may be a cellulose such as carboxymethylcellulose, polyvinyl alcohol, polyvinyl methyl ether, polyacrylic acid and its salt, oxidized starch, phosphorylated starch, casein, any one of various modified starches, or the like. About the amount of each of the used components, the amount of the binder and that of the dispersing agent are preferably from 5 to 20 parts by weight and from 1 to 5 parts by weight, respectively, for 100 parts by weight of the electroconductivity additive, the amounts being amounts in terms of dry weight. If the amount of the used binder is too small, the adhesion between the electrode layer and the current collector may become insufficient. On the other hand, if the amount of the used binder is too large, the dispersion of the electroconductivity additive becomes insufficient so that the internal resistance may get large. If the amount of the used dispersing agent is too small, the dispersion of the electroconductivity additive may become insufficient. On the other hand, if the amount of the used dispersing agent is too large, the electroconductivity additive is covered with the dispersing agent so that the internal resistance may get large.

The kneader used for the kneading is preferably a kneader capable of applying shearing force in order to make the dispersion of the electroconductivity additive even. Specifically, there can be used a ball mill, a sand mill, a pigment disperser, a crusher, an ultrasonic disperser, a homogenizer, a planetary mixer, or the like.

The method for applying the electroconductive adhesive agent onto the current collector is not particularly limited. The agent is applied by, for example, a doctor blade method, a dipping method, a reverse roll method, a direct roll method, a gravure method, an extrusion method, brush coating or the like. The coating amount thereof is not particularly limited, and is adjusted in such a manner that the thickness of the electroconductive layer formed after the adhesive agent is dried will be usually from 0.5 to 10 μm, preferably from 2 to 7 μm.

The method for laminating the electrode layer onto the current collector to obtain an electrode is not particularly limited. Examples thereof include a method of sticking a metal foil as the current collector onto the electrode layer formed by press-molding, and a method of vapor depositing a metal into a film onto the electrode layer. When the press-molding of the electrode layer is performed inside a mold, the above-mentioned powdery mixture is supplied into the mold where the current collector is set and then the mixture is subjected to presser forming, whereby the formation of the electrode layer is attained at the same time when the electrode layer can be laminated onto the current collector. Thus, the process can be made simple.

When a sheet-form electrode layer is continuously formed by extrusion molding or rolling, a roll-type metal rolled foil coil can be used as the current collector and the metal foil can be continuously drawn out from the roll and be continuously laminated onto the electrode layer. The resultant sheet-form electrode may be further pressed to make the electrode density thereof high.

(3) Electric Double Layer Capacitor

The electric double layer capacitor of the present invention is an electric double layer capacitor having an electrode obtained by the above-mentioned production method. The electric double layer capacitor can be produced in accordance with an ordinary method using a plurality of the above-mentioned electrodes, an electrolytic solution, and parts such as a separator. Specifically, for example, the electrodes are stacked in the state that a separator is interposed therebetween, and this is wounded or folded into a capacitor form and then put into a container. An electrolytic solution is poured into the container and the container is sealed up. In this way, the electric double layer capacitor can be produced.

The electrolytic solution used in the production of the electric double layer capacitor of the invention is not particularly limited, and is preferably a non-aqueous electrolytic solution wherein an electrolyte is dissolved in an organic solvent.

The electrolyte may be any electrolyte known in the prior art, and examples thereof include tetraethylammonium tetrafluoroborate, triethylmonomethylammonium tetrafluoroborate, and tetraethylammonium hexafluorophosphate.

The solvent (electrolyte solvent) wherein these electrolytes are dissolved is not particularly limited if the solvent is a solvent which is generally used as an electrolyte solvent. Specific examples thereof include carbonates such as propylene carbonate, ethylene carbonate, and butylene carbonate; lactones such as γ-butyrolactone; sulfolanes; and nitrites such as acetonitrile. These may be used alone or in the form of a mixed solvent composed of two or more thereof. Of these, carbonates are preferred. The concentration of the electrolytic solution is usually from 0.5 mol/L or more, preferably 0.8 mol/L or more.

The separator that can be used may be a known separator, such as a micro-porous membrane or nonwoven cloth made of a polyolefin such as polyethylene or polypropylene, or a porous film made mainly of pulp, which is generally called electrolytic capacitor paper. Instead of the separator, a solid electrolyte or a gel electrolyte may be used.

EXAMPLES

The present invention will be more specifically described by way of the following working examples and comparative examples. However, the invention is not limited to these working examples. In the examples, "part(s)" and "%" are part(s) by weight and % by weight, respectively, unless otherwise specified. The particle diameter of polymers and the powdery mixtures in the examples is the number-average particle diameter obtained by measuring the diameters of 100 particles thereof selected at random in transmission electron microscopic photographs thereof and then calculating the arithmetic average of the diameters. The glass transition temperature (Tg) of the polymers is a value measured with a differential scanning calorimeter (DSC) at a temperature-elevation rate of 10° C./minute.

<Production of Electrode Layers and Electric Double Layer Capacitors>

Example 1

(Formation of an Electrode Layer)

While 170 parts of activated carbon (particle diameter: 8 µm, and specific surface area: 2000 m$^2$/g) were stirred with a Henschel mixer, thereto were sprayed and added 20 parts of an aqueous 40% dispersion of carboxyl-modified styrene/butadiene copolymer particles (Tg: −5° C., and particle diameter: 12 µm) having a crosslinked structure over 10 minutes. Next, 20 parts of acetylene black were added thereto over 10 minutes, and the components were mixed to obtain a powdery mixture having a particle diameter of 163 µm.

Into a mold, 4 cm×6 cm, was supplied 4.5 g of the resultant powdery mixture, and then the mixture was pressed at a pressing pressure of 10 MPa while heated to 80° C., thereby obtaining an electrode layer sheet of 300 µm thickness.

(Formation of a Current Collector)

In a kneader, the following were kneaded: 100 parts of acetylene black, 20 parts of a 10% solution of carboxymethylcellulose in water (Cellogen 7H, manufactured by Dai-ichi Kogyo Seiyaku Co., Ltd.), 31.3 parts of a carboxyl-modified styrene/butadiene copolymer latex (an aqueous 40% dispersion, BM-400B, manufactured by ZEON CORPORATION), and 10.2 parts of soft water. Thereafter, the resultant was diluted with soft water to obtain an electroconductive adhesive agent having a solid concentration of 30% (average particle diameter of the acetylene black, measured by a light scattering method: 0.5 µm). This electroconductive adhesive agent was applied onto an aluminum foil of 30 µm thickness and then dried to obtain a current collector having an electroconductive adhesive agent layer of 5 µm thickness.

(Production of Electrodes and an Electric Double Layer Capacitor)

A product obtained by cutting the current collector into a rectangle, 4 cm×6 cm, was set onto the bottom of a mold, 4 cm×6 cm, so as to direct the face having the electroconductive adhesive agent layer upward, and then 4.5 g of the above-mentioned powdery mixture was supplied into the mold. The mixture was pressure-formed at a pressing pressure of 10 MPa while it was heated at 80° C. In this way, electrodes wherein the thickness of their electrode layers was 300 µm were obtained.

Two out of the electrodes obtained as described above were used, and a separator, 40 µm in thickness, made of cellulose fiber was sandwiched therebetween to direct their electrode layers inwards. Furthermore, the resultant was sandwiched between two glass plates of 2 mm thickness, 5 cm width and 7 cm height, so as to produce an element.

The element was heated under a reduced pressure at 200° C. for 3 hours to remove impurities in the element. Thereafter, an electrolytic solution was infiltrated thereinto under a reduced pressure. The element was put into a cylindrical container having a rectangular bottom and made of polypropylene to produce an electric double layer capacitor. The used electrolytic solution was a solution wherein triethylmonomethylammonium tetrafluoroborate was dissolved in propylene carbonate at a concentration of 1.5 mol/L.

Example 2

An electrode layer, electrodes and an electric double layer capacitor were produced in the same way as in Example 1 except that the following was used instead of the aqueous 40% dispersion of the carboxyl-modified styrene/butadiene copolymer particles: an aqueous 40% dispersion of 2-ethylhexyl acrylate/methacrylic acid/acrylonitrile/ethylene glycol dimethacrylate copolymer particles (particle diameter: 15 µm, and Tg: −50° C.).

Example 3

An electrode layer, electrodes and an electric double layer capacitor were produced in the same way as in Example 1 except that: 170 parts of activated carbon were stirred with a Henschel mixer, 20 parts of acetylene black were added thereto and mixed therewith over 10 minutes; and next 20 parts of an aqueous 40% dispersion of carboxyl-modified styrene/butadiene copolymer particles were sprayed, added thereto, and mixed therewith over 10 minutes so as to obtain a powdery mixture, the particle diameter of which was 144 µm.

Example 4

An electrode layer, electrodes and an electric double layer capacitor were produced in the same way as in Example 1 except that: 170 parts of activated carbon and 20 parts of acetylene black were supplied into a hybridizer (manufactured by Nara Machinery Co., Ltd.) and subjected to mechanochemical treatment at a rotation number of 100 rpm over 1 minute; next, the resultant mixture was supplied into a fluidized bed granulating machine (Agglomaster manufactured by HOSOKAWAMICRON CORPORATION); and 20 parts of an aqueous 40% dispersion of carboxyl-modified styrene/butadiene copolymer particles were sprayed, added thereto and mixed therewith, in flowing air, over 10 minutes so as to obtain a powdery mixture, the particle diameter of which was 32 µm.

The activated carbon, the acetylene black and the aqueous 40% dispersion of the carboxyl-modified styrene/butadiene copolymer particles that were used in Examples 3 and 4 were the same as used in Example 1.

Comparative Example 1

To a mixture composed of 160 parts of activated carbon, 20 parts of carbon black, which were the same as used in Example 1, and 20 parts of PTFE powder, were added 104 parts of ethanol, and the components were mixed. This mixture was pre-molded into a rectangular parallelepiped form, and was paste-extrusion-molded by use of a nozzle having an extrusion contraction ratio of 40 and a rectangular section.

The resultant extruded product was used, pressure-formed in the same way as in Example 1, and then dried at 250° C. for 30 minutes to remove ethanol, thereby forming an electrode layer sheet of 300 μm thickness and electrodes, the electrode layers of which each had a thickness of 300 μm. The resultant electrodes were used to produce an electric double layer capacitor in the same way as in Example 1.

Comparative Example 2

160 parts of activated carbon and 20 parts of carbon black, which were the same as used in Example 1, were incorporated and dispersed into a solution of a styrene butadiene rubber, which had no crosslinked structure and was produced by solution polymerization, in xylene, and then the resultant mixture was dried to remove xylene. Thereafter, the resultant was pressure-formed in the same way as in Example 1, thereby forming an electrode layer sheet of 300 μm thickness and electrodes, the electrode layers of which each had a thickness of 300 μm. The resultant electrodes were used to produce an electric double layer capacitor in the same way as in Example 1.

Comparative Example 3

The same aqueous dispersion of the carboxyl-modified styrene/butadiene copolymer particles as used in Example 1 was further diluted with water to prepare an aqueous dispersion having a rubber particle concentration of 1%. To 800 parts of this aqueous dispersion of the rubber particles were added 170 parts of activated carbon and 20 parts of carbon black, which were the same as used in Example 1. These components were stirred and mixed. This mixture was dried to remove water content. The resultant aggregate was pulverized and granulated. The resultant powder was treated by press-molding in the same way as in Example 1, thereby forming an electrode layer sheet of 300 μm thickness and electrodes, the electrode layers of which each had a thickness of 300 μm. The resultant electrodes were used to produce an electric double layer capacitor in the same way as in Example 1.

Comparative Example 4

An electrode layer, electrodes and an electric double layer capacitor were produced in the same way as in Example 1 except that 8 parts of polyethylene powder having a particle diameter of 20 μm were used instead of the aqueous dispersion of the carboxyl-modified styrene/butadiene copolymer particles.

<Evaluation of the Electrode Layers, the Electrodes, and the Electric Double Layer Capacitors>

The electrode layers, the electrodes, and the electric double layer capacitors obtained in Examples 1 to 4 and Comparative Examples 1 to 4 were evaluated about the following items. The results are shown in Table 1.

(Tensile Strengths of the Electrode Layers)

These were measured in accordance with JIS K6251. Each of the electrode layers molded into the sheet form was dried at 250° C. for 1 hour, and then punched out into a form of a first-model, dumbbell-shaped test piece. The test piece was subjected to a tensile test at an atmosphere temperature of 25° C. and a tensile speed of 20 mm/minute to measure the maximum load. This measure was repeated 3 times. The average of the maximum loads was divided by the sectional area of the sheet. The resultant value was defined as the tensile strength of this electrode layer. In order to measure the sheet tensile strength in the direction along which the sheet was rolled, the punching-out was performed to make the length direction of the dumbbell-shaped test piece consistent with the rolling extrusion direction. As the tensile strength of the electrode layer is larger, the layer is less cracked or broken and the shape-maintainability thereof is better.

(Evaluation Criterion)

⊚: A result 20% or more better than that of Comparative Example 1 was obtained.
○: A result better than that of Comparative Example 1 was obtained.
Δ: A result equivalent to that of Comparative Example 1 was obtained.
x: A result poorer than that of Comparative Example 1 was obtained.

(Bending Strengths of the Electrodes)

Each of the resultant electrodes for electric double layer capacitors was cut out into two rectangles of 100 mm length and 50 mm width as test pieces. A measurement was made in accordance with a method described in JIS K5600-5-1. As the device for the test, a device of type 1 was used. The diameters of used cylindrical mandrels in its bending region were two of 25 mm and 32 mm. Each of the test pieces was fitted onto the test device and a hinge was bent at an angle of 180° from a horizontal state. Thereafter, cracks in the electrode were observed with a loupe. The test piece was evaluated based on the following criterion:
In the cases of the 25 mm and 32 mm diameters, no crack was observed: ⊚
In the case of the 25 mm diameter, cracks were observed, but in the case of the 32 mm diameter, no crack was observed: ○
In the cases of the 25 mm and 32 mm diameters, cracks were observed: Δ
At the mandrel region(s), the test piece thereon fractured: x (Electrostatic capacity, and internal resistance)

At 25° C., each of the capacitors was charged up to 2.7 V from 0 V at a constant current of 10 mA/cm$^2$ over 10 minutes, and then discharged up to 0 V at a constant current of 1 mA/cm$^2$. The electrostatic capacity thereof was obtained from the resultant charging and discharging curve, and then divided by the weight of the electrode layer, which was obtained by subtracting the weight of the current collector from the weight of the electrode, so as to give the electrostatic capacity per unit weight of the electrode layer. The internal resistance was calculated from the charging and discharging curve by the calculating method of the standard RC-2377 prescribed by Japan Electronics and Information Technology Industries Association.

TABLE 1

|  | Electrode layer strength | Bending strength | Electrostatic capacity (F/g) | Internal resistance (ΩF) |
| --- | --- | --- | --- | --- |
| Example 1 | ○ | ○ | 53.3 | 5.6 |
| Example 2 | ⊚ | ⊚ | 55.3 | 5.6 |
| Example 3 | ○ | ⊚ | 55.7 | 5.5 |
| Example 4 | ○ | ⊚ | 58.9 | 4.8 |
| Comparative Example 1 | Δ | ○ | 48.1 | 6.3 |
| Comparative Example 2 | ○ | ○ | 48.3 | 6.2 |
| Comparative Example 3 | ○ | Δ | 38.6 | 6.4 |
| Comparative Example 4 | X | X | 35.4 | 7.7 |

It can be understood from Table 1 that according to the invention (Examples 1 to 4), electric double layer capacitors having excellent electrode layer strength, high capacity and small internal resistance were obtained. Comparative Examples 1 to 4 were poorer, particularly, in capacity and internal resistance than the Examples.

The above has described the present invention in connection with embodiments which appear to be most preferable and most practical at present. However, the invention is not limited to the embodiments disclosed in the present specification, and can be appropriately modified within the scope which does not depart from the subject matter or the conception of the invention which can be understood from the claims and the whole of the specification. It should be understood that electrodes for electric double layer capacitors, methods for producing the same, and electric double layer capacitors with such modification are also included in the technical scope of the invention.

INDUSTRIAL APPLICABILITY

As described above, according to the invention, it is possible to provide a method for producing an electrode for giving an electric double layer capacitor having a high capacity, with a high productivity, through simplified steps.

The invention claimed is:

1. A method for producing an electrode for an electric double layer capacitor, comprising:
    a step of mixing a particulate elastomer with a carbonaceous material to obtain a powdery mixture, the powdery mixture comprising at least the particulate elastomer and the carbonaceous material as solids;
    wherein the particulate elastomer is selected from the group consisting of polybutadiene modified with a carboxyl group, polyisoprene modified with the carboxyl group and styrene/butadiene copolymer modified with the carboxyl group,
    the carbonaceous material comprises activated carbon as an active material, and
    at the time of mixing the particulate elastomer and the carbonaceous material, there is a concentration of solid content of the powdery mixture of 50% or more by weight, based on a total weight of the powdery mixture, the particulate elastomer is evenly absorbed on the carbonaceous material thereby the carbonaceous material and the particulate elastomer are kept in a powder form and a particle diameter of the resultant powdery mixture is from 0.1 to 1000 µm, and
    a step of dry-forming said powdery mixture to form an electrode layer,
    wherein the powdery mixture comprises 2 to 10 parts by weight of the particulate elastomer per 100 parts by weight of a combination of the particulate elastomer and the carbonaceous material, and
    at the time of dry-forming the powdery mixture, the concentration of the solids content of the powdery mixture is 50% or more by weight, based on the total weight of the powdery mixture.

2. The method according to claim 1, wherein the particulate elastomer is an elastomer having a crosslinked structure.

3. The method according to claim 1, wherein the carbonaceous material further comprises an additive that increases electroconductivity.

4. The method according to claim 3, which further comprises a step of causing the electroconductivity additive to adhere onto a surface of said active material by mechanochemical treatment.

5. The method according to claim 1, wherein the powdery mixture is a mixture obtained by fluidized bed granulation or fluidized bed multifunction mode granulation.

6. The method according to claim 1, wherein the dry-forming is press-molding.

7. The method according to claim 6, wherein the press-molding is performed inside a mold wherein a current collector is set.

8. The method according to claim 1, wherein the particulate elastomer is sprayed in the step of mixing the particulate elastomer and the carbonaceous material.

* * * * *